United States Patent
Farjadrad

(10) Patent No.: US 10,447,506 B1
(45) Date of Patent: Oct. 15, 2019

(54) DUAL-DUPLEX LINK WITH INDEPENDENT TRANSMIT AND RECEIVE PHASE ADJUSTMENT

(71) Applicant: Aquantia Corporation, San Jose, CA (US)

(72) Inventor: Ramin Farjadrad, Los Altos, CA (US)

(73) Assignee: Aquantia Corp., Milpitas, CA (US)

( * ) Notice: Subject to any disclaimer, the term of this patent is extended or adjusted under 35 U.S.C. 154(b) by 0 days.

(21) Appl. No.: 15/478,046

(22) Filed: Apr. 3, 2017

Related U.S. Application Data

(60) Provisional application No. 62/317,493, filed on Apr. 1, 2016.

(51) Int. Cl.
| | | |
|---|---|---|
| *H03L 5/00* | (2006.01) | |
| *H04L 25/03* | (2006.01) | |
| *H04L 5/14* | (2006.01) | |
| *H04L 7/04* | (2006.01) | |

(52) U.S. Cl.
CPC .......... *H04L 25/03019* (2013.01); *H04L 5/14* (2013.01); *H04L 7/04* (2013.01)

(58) Field of Classification Search
CPC ........ H04L 25/03019; H04L 7/04; H04L 5/14
See application file for complete search history.

(56) References Cited

U.S. PATENT DOCUMENTS

| | | | |
|---|---|---|---|
| 6,772,351 B1 | 8/2004 | Werner | |
| 7,535,958 B2* | 5/2009 | Best | H04B 1/7183 |
| | | | 375/130 |
| 7,978,754 B2* | 7/2011 | Yeung | G11C 7/20 |
| | | | 375/224 |
| 8,004,330 B1 | 8/2011 | Acimovic | |
| 8,483,579 B2 | 7/2013 | Fukuda | |
| 8,948,203 B1 | 2/2015 | Nolan | |
| 9,294,313 B2 | 3/2016 | Prokop | |
| 9,432,298 B1 | 8/2016 | Smith | |
| 2005/0089126 A1 | 4/2005 | Zerbe | |
| 2006/0170453 A1 | 8/2006 | Zerbe | |
| 2007/0281643 A1* | 12/2007 | Kawai | H04B 1/0483 |
| | | | 455/185.1 |
| 2008/0310491 A1 | 12/2008 | Abbasfar | |
| 2009/0304054 A1 | 12/2009 | Tonietto | |
| 2011/0038286 A1 | 2/2011 | Ta | |
| 2012/0216084 A1 | 8/2012 | Chun | |
| 2013/0222026 A1* | 8/2013 | Havens | H03L 7/0995 |
| | | | 327/158 |
| 2014/0126613 A1* | 5/2014 | Zhang | H03D 3/02 |
| | | | 375/219 |
| 2014/0269860 A1* | 9/2014 | Brown | H04B 3/54 |
| | | | 375/229 |
| 2015/0012677 A1 | 1/2015 | Nagarajan | |
| 2015/0146766 A1 | 5/2015 | Longo | |
| 2015/0180760 A1 | 6/2015 | Rickard | |
| 2016/0217872 A1* | 7/2016 | Hossain | G11C 27/02 |

* cited by examiner

*Primary Examiner* — Jay P Patel
(74) *Attorney, Agent, or Firm* — Lance Kreisman; Peninsula Patent Group

(57) ABSTRACT

A Serializer/Deserializer (SERDES) circuit is disclosed. The circuit includes an input/output (I/O) pad for coupling to a duplex SerDes link. An adjustable delay line provides a first component of a relative phase between a receive signal sampling point and a transmit echo signal. A second delay circuit generates a second component of the relative phase. A timing relationship between the receive signal sampling point and the transmit echo signal is based on the sum of the first and second components.

19 Claims, 4 Drawing Sheets

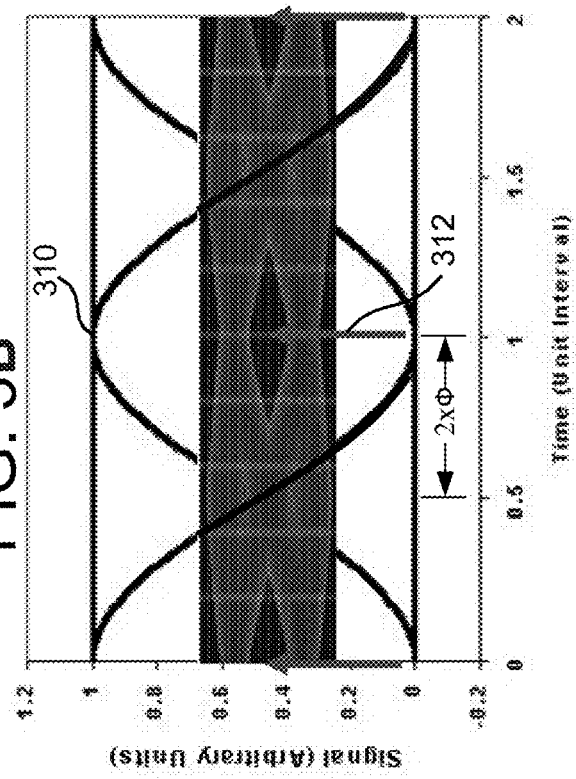
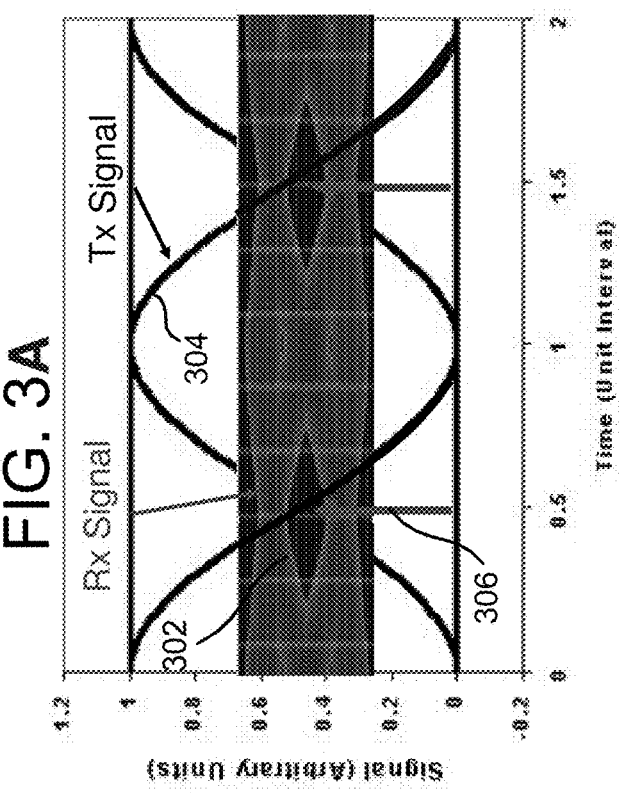

DUAL-DUPLEX LINK WITH INDEPENDENT TRANSMIT AND RECEIVE PHASE ADJUSTMENT

TECHNICAL FIELD

The disclosure herein relates to communications systems, and more specifically to high-speed signaling systems and methods.

BACKGROUND

Serializer/Deserializer (SerDes) links are widely used in various high-speed communications applications. The links generally provide for converting parallel data into serial form for high-speed data transfers across a minimum number of electrical paths. FIG. 1 illustrates several applications for SerDes links, such as board-to-board links 102, chip-to-chip links 104, backplane links 106, and box-to-box links 108, to name a few.

One particular form of SerDes link involves a dual-duplex architecture, shown generally in FIG. 2, that employs dual links 202 and 204 that both operate to transmit and receive data bidirectionally. While this architecture works well for its intended applications, transmit operations may cause reflections, or echoes, from the opposite end of the link, contributing to bit errors. This is often due to the receive signal being typically about 40 dB below the transmit signal on the same channel. What is needed is an efficient method and apparatus to cancel transmit echoes for dual-duplex SerDes links.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 3A illustrates one embodiment of a timing relationship between a receive signal phase and a transmit signal phase.

FIG. 3B illustrates a further embodiment of a timing relationship between the receive signal phase and the transmit signal phase.

DETAILED DESCRIPTION

Embodiments of apparatus and methods for SerDes links are disclosed. In one embodiment, a Serializer/Deserializer (SERDES) circuit is disclosed. The circuit includes an input/output (I/O) pad for coupling to a duplex SerDes link. An adjustable delay line provides a first component of a relative phase between a receive signal sampling point and a transmit signal edge. A second delay circuit generates a second component of the relative phase. A timing relationship between the receive signal sampling point and the transmit echo signal is based on the sum of the first and second components.

FIG. 3A illustrates an eye-diagram chart that illustrates a timing relationship between a receive signal (that forms the "eye"), at 302, and a reflected transmit signal (transmit echo), at 304. The receive signal is generally sampled in response to receiving an edge of a reference or sampling clock that is aligned to the middle of the received signal "eye", at sampling point 306. This is also the point at which transmit echo cancellation would take place, to eliminate the transmit echo signal. This occurs the middle of the received signal eye and the transmit signal edge are substantially phase-aligned at the receiver sampling point. Cancelling the transmit signal, which is large, while it is in a relatively small "eye" is very difficult since the slightest jitter, such as 10 ps, can change the results of the cancellation significantly.

FIG. 3B illustrates a situation where the phase of the transmit echo signal and the receive signal are delayed, such as by a phase value of 2×Φ, in order to have a situation where the peak of the transmit echo signal, at 310, is phase aligned with the peak of the receiver signal (middle of the eye) and receiver sampling point, at 312. This timing alignment is more desirable for cancelling the transmit echo signal. Embodiments described below disclose various ways to achieve this optimum timing relationship.

Figure 1:
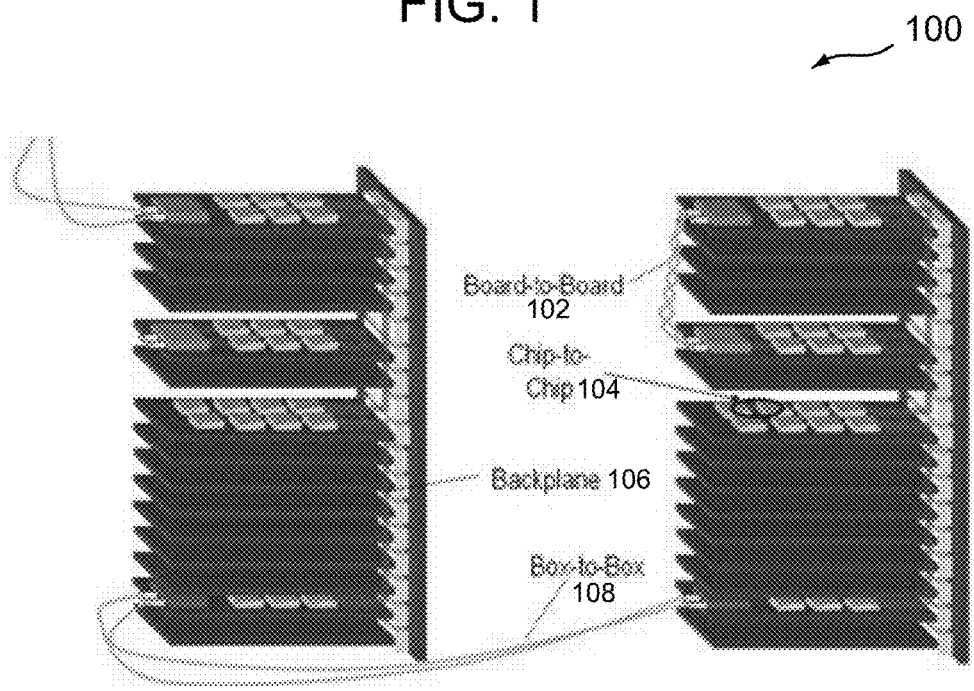
FIG. 1 illustrates two computer servers with various SerDes links.
Figure 2:
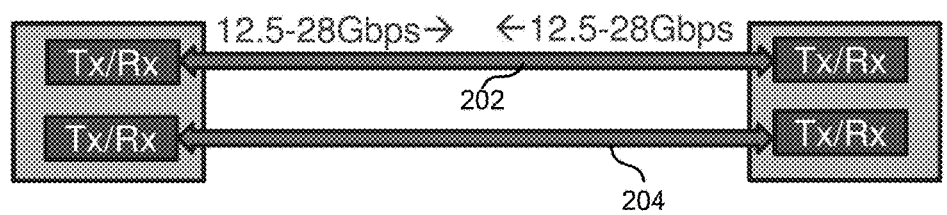
FIG. 2 illustrates one embodiment of a dual-duplex SerDes link.
Figure 4:
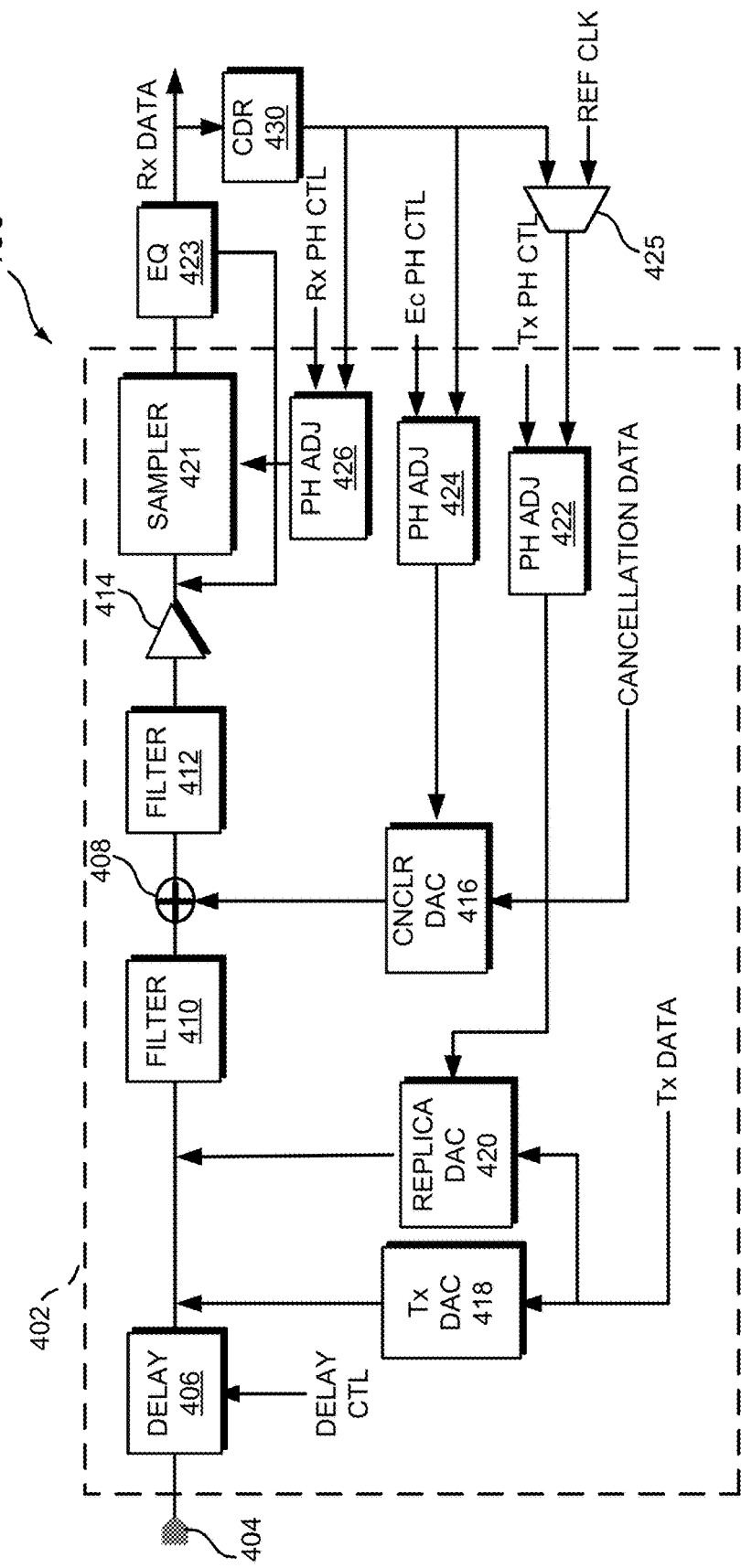
FIG. 4 illustrates a block diagram of one embodiment of a SerDes input/output (I/O) circuit architecture.

FIG. 4 illustrates a block diagram of one embodiment of a Serializer/Deserializer (SerDes) input/output (I/O) circuit architecture, generally designated 400, that creates delay between a far-end received signal and a near-end transmit signal at the near-end receiver sampling point. The architecture includes analog signal processing circuitry 402 coupled to an input/output (I/O) pad 404. The analog signal processing circuitry 402 includes an adjustable delay line 406, summing circuitry 408, a first filter such as an aliasing filter 410, a second filter such as a boost filter 412 and a programmable gain amplifier (PGA) 414. The adjustable delay line 406 adjusts a relative phase offset between near-end receive and transmit signal phases by a phase value Φ. The summing circuitry 408 generally receives compensation signals from an interference canceller digital-to-analog converter (DAC) 416, aliasing filter 410, transmit DAC 418, and a pre-echo canceller 420. The pre-echo canceller 420 may be configured as a pre DAC to compensate for the transmit signal generated by the transmit DAC 418.

With continued reference to FIG. 4, a sampler 421 receives the output of the PGA 414 and samples the signal in response to a clock signal. An equalizer 423 may then apply equalization to the signal, resulting in receive data.

Further referring to FIG. 4, multiple phase interpolators 422, 424, and 426 provide separate phase shifts for the clock signal selected by multiplexer 425, from either a reference clock (in the case where the circuit is configured as a "master") or a clock signal generated from a clock and data recovery (CDR) circuit 430 (in the case where the circuit is configured as a "slave"). The first phase interpolator 422 is responsive to a transmit phase offset value to shift a clock signal by the value (corresponding to the transmit transition phase value Φ) that is fed to the pre-echo canceller (replica DAC) 420. The first phase interpolator 422 may also provide for a negative phase offset in some embodiments. The second phase interpolator 424 shifts a clock signal fed to the interference canceller ("CNCLR DAC") 416 by the same phase value Φ. The third phase interpolator 426 provides a phase shift to a recovered clock signal for sampling purposes, with the circuit configured as a slave device. The phase delay provided by the phase interpolators 422, 424 and 426 counteracts the effects to the far-end transceiver as a result of the adjustable delay line phase delay Φ. Yet the effective phase shift between the near-end receiver and transmitter will be 2×Φ.

In operation, the full relative delay of 2×Φ may be achieved by setting the adjustable delay line 406 to a delay of Φ, and also setting the phase interpolators 422, 424 and 426 to the same phase delay Φ. In this manner, the analog delay line 406 can be smaller and more easily able to fit on-chip. Alternatively, the delay line from the transmitter to the I/O pad 404 may be fixed while receiver taps at different points in the delay line are adjusted. In this case, the pre echo driver phase may be adjusted by the phase interpolator 422.

As noted above, in some situations, the respective opposite ends of a given SerDes link may be identified as master and slave devices. A "master" configuration utilizes a reference clock for data transmit and receive purposes. A "slave" configuration receives and recovers the reference clock from the master, and uses the same clock to transmit data back to the master. Generally, for a slave configuration, the near-end transmit and receive phase shifts may generally be set and left as-is since if the far side phase shift moves, the slave transmit and receive phases move together. Thus, no adjustable delay line is required for a slave configuration. However, in the case of a master configuration, if the far side moves, the transmit phase for the master changes. This can cause problems for the master receiver. Further, the delay associated with the channel generally changes with temperature.

With the above in mind, and with both the master and slave having adjustable delay circuitry on-chip, the link may utilize the additional delay provided by the slave to compensate for phase drift caused by PVT effects during live link operation. However, measuring the variation in delay during operation, and communicating the variation to both sides of the link generally involves some form of backchannel communication (from the master to the slave). A suitable point to carry this out is during a link training step at initialization. This results in different modes of delay control, depending on whether the link is starting up, or is in a live operating mode. Thus, during initialization and training, the slave delay line may contribute to the overall delay (from the master and slave delay lines), while during live link operation, the master controls the delay adjustments by monitoring the phase difference between the master transmit and receive phases, and employing the master delay line to correct for delay variations in the channel (thus preserving maximum bandwidth along the channel).

For some embodiments, certain clocking considerations may optimize the echo cancellation capability at the master device. For instance, for optimal near-end echo cancellation, the receive clock may track the near-end transmit clock phase at high frequency. At low frequencies, the receive clock may be used to track the roundtrip clock phase for far-end echo cancellation. In some situations, it may be beneficial to set the slave CDR tracking bandwidth for best receive data tracking. In such circumstances, the master CDR tracking bandwidth may be set below the slave CDR bandwidth. Additional optimizations may include employing a strong anti-aliasing filter, such as a notch filter, between the transmitter and receiver with a bandwidth set at the received signal Nyquist frequency. This suppresses high frequency echo cancellation error, especially at transmit transition edges, due to mismatches in the transmit and pre-echo driver circuitry and the cancellation path.

Figure 5:
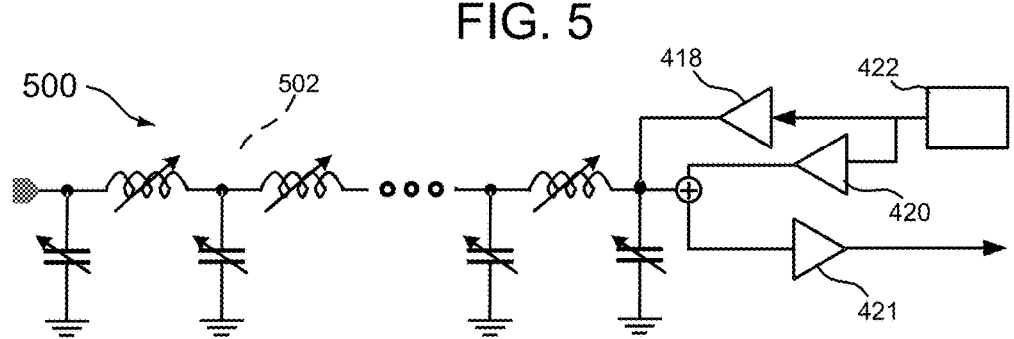
FIG. 5 illustrates one embodiment of a variable delay line for use with the SerDes I/O architecture of FIG. 4.

FIG. 5 illustrates one embodiment of an adjustable delay line, generally designated 500, suitable for use with the architecture of FIG. 4. For one embodiment, the adjustable delay line includes multiple programmable inductor/capacitor (LC) cells 502 coupled in a serial arrangement to provide a selectable amount of phase delay in both transmit and receive directions, with a granularity of, for example one-quarter of a symbol time. For each variable delay cell 502, both of the inductor and capacitor values are controlled so as to adjust the propagation delay, which is proportional to SQRT(LC), while maintaining the proper impedance, which is SQRT(L/C), matched to the input transmission line. The delay line 500 is shown coupled to the various components of FIG. 4 including respective transmit and echo DACs 418 and 420, interpolator 422 and sampler 421.

Figure 6:
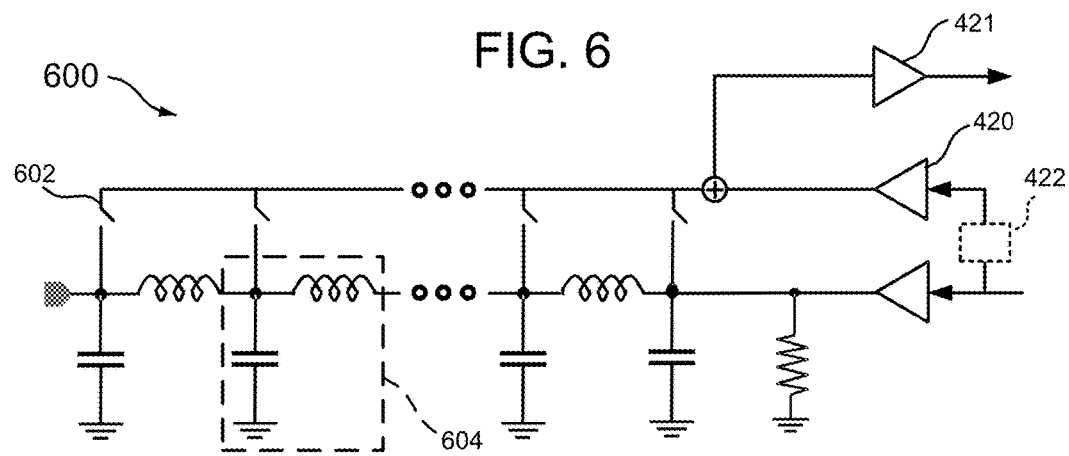
FIG. 6 illustrates a further embodiment of a variable delay line for use with the SerDes I/O architecture of FIG. 4.

FIG. 6 illustrates an alternative embodiment of an adjustable delay line, generally designated 600. The circuitry is similar to the embodiment of FIG. 5, but employs programmable switches 602 to activate a selected number of delay cells 604 to satisfy a total desired delay for the receiver sampler 421. The transmit path, however, sees a fixed delay based on the number of delay cells. For this embodiment, no additional phase delay from the interpolator is needed. However, the echo (replica) DAC 420 still utilizes additional phase delay from its interpolator 422 to properly cancel the transmit signal at the point the receive signal is sampled. Note that the interpolator phase shift may be introduced before (in phantom) or after the echo DAC 420, depending on implementation considerations (such as timing mismatch).

Figure 7:
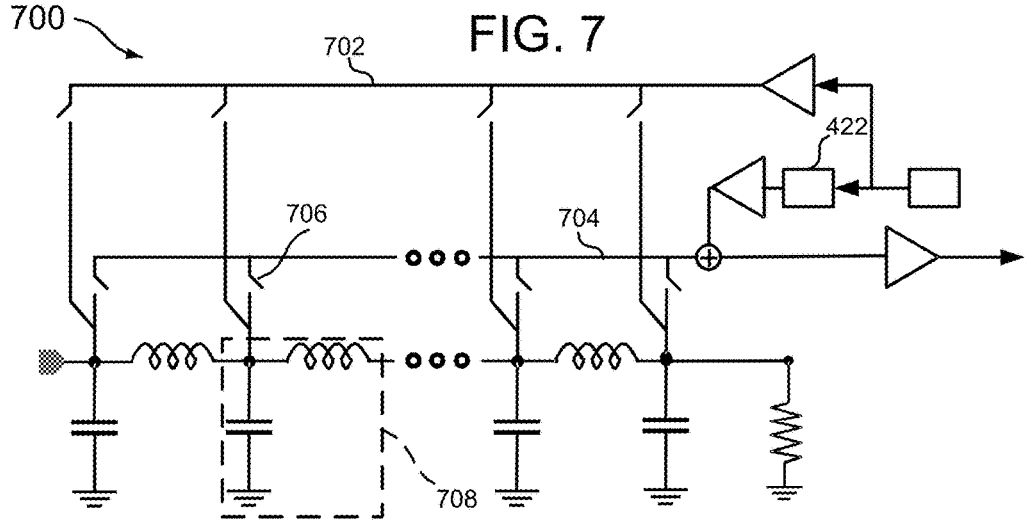
FIG. 7 illustrates a further embodiment of a variable delay line for use with the SerDes I/O architecture of FIG. 4.

FIG. 7 illustrates an embodiment of a delay line, generally designated 700, that selectively connects the receiver and transmitter to different points in a fixed delay line using two separate switch arrays 702 and 704. Each switch array employs switches 706 that selectively connect to a fixed delay line of LC delay cells 708. To avoid undesirably large capacitance that may limit transmit driver headroom, the transmit switches to the LC delay cells should be large enough to conduct large transmit current signals with relatively little current-voltage drops. Any parasitic switch capacitance may be combined as part of a total capacitance that corresponds to the desired LC delay capacitance that satisfies both the transmission line characteristic impedance and the propagation delay.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A Serializer/Deserializer (SERDES) circuit comprising:
    an input/output (I/O) pad for coupling to a duplex SerDes channel;
    an adjustable delay line to provide a first component of a relative phase between a far-end received signal and a near-end transmit signal, wherein the first component comprises an applied adjustable delay;
    a phase adjustment circuit to generate a second component of the relative phase; and
    wherein a timing relationship between the receive signal phase and the transmit signal phase is based on the sum of the first component and the second component.

2. The SERDES circuit according to claim 1, wherein the adjustable delay line includes:
    multiple inductor-capacitor (LC) delay cells formed on-chip, each LC delay cell having a variable delay parameter.

3. The SERDES circuit according to claim 1, wherein the adjustable delay line includes:
    multiple inductor-capacitor (LC) delay cells formed on-chip, each LC delay cell having a fixed delay parameter and switchably coupled to the receiver sampler.

4. The SERDES circuit according to claim 3, wherein each LC delay cell is switchably coupled to the receiver sampler and a transmitter driver.

5. The SERDES circuit according to claim 1, wherein the SERDES circuit is configured as a slave device to communicate with a master device, and wherein data transmit and receive operations are synchronized with a timing signal generated by the master device.

6. The SERDES circuit according to claim 5, wherein the adjustable delay line is selectively enabled to extend a range of delay for the master device.

7. The SERDES circuit according to claim 1, wherein the SERDES circuit is configured as a master device to communicate with a slave device, and wherein data transmit and receive operations are synchronized with a timing signal generated by the master device.

8. A method of operation in a Serializer/Deserializer (SERDES) circuit, the method comprising:
    providing a first component of a relative phase between a far-end received signal phase and a near-end transmit signal phase, wherein the providing the first component comprises applying an adjustable delay to achieve the first component of the relative phase;
    generating a second component of the relative phase; and
    wherein a timing relationship between the far-end received signal and the near-end transmit signal is based on summing the first component and the second component.

9. The method according to claim 8, wherein applying an adjustable delay comprises:
    varying a delay parameter for each of multiple inductor-capacitor (LC) delay cells formed on-chip.

10. The method according to claim 8, wherein applying an adjustable delay comprises:
    setting a fixed delay parameter for each of multiple inductor-capacitor (LC) delay cells formed on-chip; and
    switchably coupling selected LC delay cells to a receiver sampler.

11. The method according to claim 10, wherein applying an adjustable delay comprises:
    switchably coupling selected LC delay cells to a transmitter driver.

12. The method according to claim 8, further comprising:
    configuring the SERDES circuit as a slave device for communicating with a master device; and
    synchronizing data transmit and receive operations with a timing signal generated by the master device.

13. The method according to claim 12, wherein the method further comprises:
    selectively adjusting the relative phase on the slave device to extend a range of delay for the master device.

14. The method according to claim 8, further comprising:
configuring the SERDES circuit as a master device for communicating with a slave device;
generating a timing signal on the master device; and
synchronizing data transmit and receive operations on the master device and the slave device with the timing signal.

15. A Serializer/Deserializer (SERDES) link comprising:
a signaling channel;
a first SERDES circuit coupled to a first end of the signaling channel; and
a second SERDES circuit coupled to a second end of the signaling channel to communicate with the first SERDES circuit;
wherein the second SERDES circuit includes
an adjustable delay line to provide a first component of a relative phase between a far-end received signal and a near-end transmit signal, wherein the first component comprises an applied adjustable delay;
a phase adjustment circuit to generate a second component of the relative phase; and
wherein a timing relationship between the received signal and the transmit signal is based on the sum of the first component and the second component.

16. The SERDES link according to claim 15, wherein:
the first SERDES circuit is configured as a slave device;
the second SERDES circuit is configured as a master device; and
wherein data transmit and receive operations for both the master device and the slave device are synchronized to a timing signal generated by the master device.

17. The SERDES link according to claim 15, wherein the adjustable delay line includes:
multiple inductor-capacitor (LC) delay cells formed on-chip, each LC delay cell having a variable delay parameter.

18. The SERDES link according to claim 15, wherein the adjustable delay line includes:
multiple inductor-capacitor (LC) delay cells formed on-chip, each LC delay cell having a fixed delay parameter and switchably coupled to the receiver sampler.

19. The SERDES link according to claim 18, wherein each LC delay cell is switchably coupled to the receiver sampler and a transmitter driver.

* * * * *